Patented Feb. 20, 1940

2,190,918

UNITED STATES PATENT OFFICE 2,190,918

PROCESS FOR IMPROVING LUBRICATING OILS

Herbert Goethel, Duisburg, Heinrich Tramm, Oberhausen-Holten, and Paul Schaller, Oberhausen-Sterkrade, Germany, assignors to Ruhrchemie Aktiengesellschaft, Oberhausen-Holten, Germany No Drawing. Application July 5, 1935, Serial No. 30,012. In Germany July 10, 1934

3 Claims. (Cl. 196—151)

It has already been proposed to improve lubricating oils by the use of hydrocarbons which are colloidally soluble in the oils. Examples of such hydrocarbons that have been suggested are polystyrol, hydrogenated polystyrol, polyindene, and like substances. Commercially it is very difficult to secure these substances, and complicated chemical processes are necessary to produce them.

It has been found possible to improve lubricating oils and raise the viscosity of benzines, gas oils and lignite tarry oils, as well as of liquid hydrocarbons obtained by hydrogenation and hydrocarbons resembling benzine obtained by converting carbon monoxide with hydrogen at normal pressure, by the use of products which are first obtained in a simple manner by treating gases containing propylene and ethylene with such polymerization and condensation catalysts as aluminium chloride, iron chloride, zinc chloride and boron fluoride, to which, if required, reaction-accelerating substances such as mercuric chloride, or reaction-retarding substances such as aluminium oxide, water, and zinc oxide, have been added. The reaction on the ethylene and propylene may take place in the presence of dilute gases or on the olefines mentioned in a practically pure state. It has been found that a particularly suitable commencing substance for obtaining the additional substances is coke oven gas, or a mixture of the olefines present in the coke oven gas. During the reaction of, for example, aluminium chloride on the ethylene and propylene of coke oven gas polymerisation products in a highly viscous state are obtained, which at 100° C. have, for example, a viscosity of 20° Engler. By adding these substances to paraffin oil it is possible to produce a usable lubricating oil from the paraffin oil. For example, very small quantities of the added substances suffice to remove from benzine the property of eating into moving machine elements, such as shafts or pistons, with which the benzine comes into contact.

It thus becomes a simple matter to render of use for a very valuable purpose just these two very low olefines which occur in commerce on a large scale as a by-product which hitherto has been practically useless. The action of the catalysts referred to may be carried out at normal pressure or at a higher pressure and at normal temperature, at a raised temperature but advantageously at a reduced temperature. It has been recognised as being of importance that in all these cases the content of water in the gases reacting on the catalysts be kept as low as possible, as otherwise the catalysts are consumed too quickly. The gases may be dried, for example, by washing with anhydrous glycerine in countercurrent, by washing with a mixture of glycol and glycerine, or in any other suitable manner. The presence of small quantities of other higher olefinic hydrocarbons does not affect the process.

It is a surprising fact that lubricating oils can be improved with polymerization products that have been obtained by treating gases containing ethylene and propylene with polymerizing agents, as experiments conducted by others for the purpose of securing lubricants from ethylene by polymerization have not been successful. The production from ethylene or gases containing ethylene of additional substances that increase viscosity is rendered possible only by the presence of propylene, and it is even possible to produce polymerization products from propylene alone by the use of the agents indicated. Table I indicates the improvements obtained by adding a propylene polymerization product to commercial refrigerator oil. They show that its viscosity is very much improved by the addition and that at the same time a lubricating oil is obtained the degree of viscosity of which is dependent to a lesser extent upon the temperature. With an addition of a 40% propylene polymerization product the point of solidification is —39° C. and is thus excellent even with this large addition. The improvement in the qualities of the lubricating oil is thus expressed by the greater resistance to oxidation of the lubricating oil thus obtained. The "tarification" coefficients drop from 0.43 to zero, and the Sligh test (A. S. T. M.) shows a drop from 1.53 to zero. The coking coefficient falls with a pure refrigerator oil from 102 to 36.2 in the case of a 40% addition of a propylene polymerization product.

The improvements obtained by adding the polymerization product of a mixture of olefines obtained from ethylene and propylene to commercial refrigerator oil are set out in Table II. These improvements consist in the raising of viscosity, the lowering of the viscosity index (that is a small dependence of the degree of viscosity upon temperature) and a substantial increase in the resistance to oxidation, which is demonstrated by a corresponding lowering of the coking and tarification coefficients. The solidification point is satisfactory even when a 50% addition of an ethylene-propylene polymerization product is added to a commercial refrigerator oil, since it lies at —29° C.

The improvements obtained by adding the polymerization product of a mixture of olefines obtained from ethylene and propylene to commercial refrigerator oil are set out in the accompanying table. These improvements consist in the raising of viscosity and the lowering of the viscosity pole height. The term "viscosity pole height" has the meaning that is attached to it by Prof. Dr. L. Ubbelohde in his work "Zur Viskosimetrie," published by Mineralölforschung, of Berlin, W. 8. The greater the pole height of a series of oils the greater is the dependence of the viscosity on temperature and the less valuable is the oil. The best American oils have a pole height of 1.9, Russian oils, for example, 2.6 to 2.7 and very poor oils 3.7. The improvements also include a substantial increase in the resistance to oxidation, which is demonstrated by a corresponding lowering of the coking and tarification coefficients. The solidification point is satisfactory even when a 50% addition of an ethylene-propylene polymerization product is added to a commercial refrigerator oil, since it lies at −29° C.

pressure vessel is maintained from without at a temperature of −30° C. Of the total volume of gas 150 parts of the olefines are absorbed. The aluminium chloride is removed from the dark-brown sticky reaction product in the usual manner by adding water. The liquid, which is washed in a solution of petroleum ether and then dried, has a specific gravity of 0.9012 and a viscosity of 21° Engler at 100° C. after the solvent has been distilled off.

If one part of this oil be mixed with the same quantity of paraffin oil (specific gravity 0.8670, viscosity 3.68° and 1.9° Engler at 25° and 50° C. respectively), a lubricating oil is obtained after the solvent has been removed and after distillation under reduced pressure, which has a specific gravity of 0.8865 at 22° C., a viscosity of 59.3°, and 9.8° Engler at 22° and 50° C. respectively, and a solidification point of −46° C.

The polymerization products hereinbefore described are produced principally by the low temperature polymerization of mixtures of propylene Table I Experiments conducted on a refrigerator oil and its mixtures with a propylene polymerization product

| | Refrigerator oil | Refrigerator oil +10% polymerization product | Refrigerator oil +20% polymerization product | Refrigerator oil +30% polymerization product | Refrigerator oil +40% polymerization product |
|---|---|---|---|---|---|
| Specific gravity— | | | | | |
| At 20° C | 0.8924 | 0.8900 | 0.8880 | 0.8860 | 0.8825 |
| At 50° C | 0.8699 | 0.8670 | 0.8658 | 0.8650 | 0.8633 |
| Viscosity in centipoises— | | | | | |
| At 20° C | 28.5 | 33.7 | 39.4 | 48.9 | 103.0 |
| At 50° C | 7.9 | 8.97 | 10.13 | 11.77 | 20.38 |
| Viscosity in degrees Engler— | | | | | |
| At 20° C | 4.34 | 5.11 | 5.98 | 7.36 | 15.3 |
| At 50° C | 1.73 | 1.855 | 1.98 | 2.16 | 3.3 |
| Viscosity pole height | 3.3 | 2.9 | 2.7 | 2.65 | 2.6 |
| Coking coefficient | 102 | 69 | 45 | 38 | 36.2 |
| Tarification coefficient | 0.43 | 0.25 | 0.10 | 0.0 | 0.0 |
| Sligh test (A. S. T. M.) | 1.53 | 0.59 | 0.40 | 0.0 | 0.0 |
| Solidfication point °C | −55 | −50 | −47 | −43 | −39 |

Table II

Experiments conducted on a refrigerator oil and its mixtures with a propylene-ethylene polymerization product

| | Refrigerator oil | Refrigerator oil + 30% polymerization product | Refrigerator oil + 50% polymerization product | Refrigerator oil + 80% polymerization product |
|---|---|---|---|---|
| Specific gravity— | | | | |
| At 20° C | 0.8924 | 0.8855 | 0.8821 | 0.8771 |
| At 50° C | 0.8699 | 0.8665 | 0.8638 | 0.8602 |
| Viscosity in centipoises— | | | | |
| At 20° C | 28.5 | 97 | 169.6 | 2340 |
| At 50° C | 7.9 | 18.86 | 28.9 | 188.6 |
| Viscosity in degrees Engler— | | | | |
| At 20° C | 4.34 | 14.25 | 25.45 | 351 |
| At 50° C | 1.73 | 3.07 | 4.55 | 28.9 |
| Viscosity pole height | 3.3 | 3.2 | 2.9 | 3.18 |
| Coking coefficient | 102 | 56 | 32 | 28 |
| Tarification coefficient | 0.43 | 0.29 | 0.19 | 0.04 |
| Solidification point °C | −55 | −37 | −29 | +1 |

Example 1

A dry gas mixture of 37% propylene and 15% ethylene, which is obtained from coke oven gas either by low temperature condensation or by absorption by active carbon during the subsequent driving off, is fed into ten parts of anhydrous aluminium chloride in a pressure vessel at a super-pressure of 15 atmospheres while stirring for two to three hours. During this period the and ethylene which have been recovered from cracking gas, coke gas or similar commercial gases by treatment with active carbon or by low temperature condensation. The mixtures of ethylene and propylene which are to be recovered by active carbon adsorption or by a process of low temperature condensation or washing always contain in addition saturated hydrocarbons. These saturated hydrocarbons, which boil at a low temperature, seem to act during condensation directly as an extraction agent, and they result in the production of very useful oils. Aluminium chloride, iron chloride, zinc chloride, boron fluoride and the like may be used as catalysts. The best polymerization temperatures have been found to be temperatures of −30° C. although temperatures lying below zero may be employed. It has been found advantageous to draw off continuously the reaction heat generated during the operation. It is a very simple matter during this operation to separate the polymerization products from the layers of catalysts, so that the catalyst can be used repeatedly, for example as many as ten times, without any necessity for decomposing the water or lye, which is otherwise carried out in the usual manner. It has also been found advantageous to stir thoroughly. It is also under certain conditions preferable to heat the reaction mixture to room temperature in the presence of the catalysts after the very violent reaction at low temperatures has ceased. When operating under ordinary pressure it has been found advantageous to employ a return-flow cooler cooled to a low temperature, which operates at the low temperatures at which the mixtures of ethylene and propylene condense. The oils recovered have an almost straight viscosity curve, similar to that of the Pennsylvanian oils, as well as low tarification and coking coefficients and effective solidification points.

*Example 2*

A mixture of hydrocarbon gases recovered from coke gas by cooling to a low temperature containing 33% of $C_3H_6$, 10% of $C_2H_4$, and the remainder, consisting mainly of ethane, propane and methane, is passed into a mixture in an autoclave made up of 20 parts of commercial paraffin oil and 10 parts taken from some aluminium chloride which has already been employed as contact for the second time for the same operation, the mixture having an internal temperature of −30° C. and a superatmospheric pressure of 8.5 atmospheres, stirring being carried on over a period of five hours. The pressure vessel is maintained for ten hours at an internal temperature of −30° C. and then heated to room temperature. The pressure at the same time rises to 28 atmospheres. The unconverted gases are expanded as a gas poor in olefines. About 80% of the added olefines of the total volume of gas has previously been polymerized. The reaction mixture is dissolved in petroleum ether and poured off from the contact. The purifying and subsequent drying operations are carried out in the solution of petroleum ether with a 30% sulphuric acid and a 30% caustic soda. The oil removed from the solvent, which has a specific gravity of 0.8645, has a viscosity of 105° Engler at 20° C., 17.6° Engler at 50° C., and 3.2° Engler at 100° C., corresponding to a viscosity pole height of 1.77 and a solidification point of −24° C. The Sligh test (A. S. T. M. oxidation coefficient) amounts to 0.2, and the coking value according to Conradson amounts to 0.16.

We claim:

1. A method for improving the characteristics of a lubricating oil which comprises adding to a lubricating oil a substantial proportion of a polymerization product of propylene and ethylene obtained from coke oven gas, the said product being obtained by treating propylene and ethylene containing material, in which the proportion of propylene predominates, under super-atmospheric pressure and at a temperature in the neighborhood of −30 degrees C. in the presence of a metal halide polymerization catalyzer for a sufficient time to permit the main reaction to take place after which the temperature is raised to room temperature under increased pressure.

2. A method for improving the characteristics of a lubricating oil which comprises adding to a lubricating oil a substantial proportion of a polymerization product of propylene and ethylene, the said product being obtained by treating propylene and ethylene containing material, in which the proportion of propylene predominates, under super-atmospheric pressure and at a temperature in the neighborhood of −30 degrees C. in the presence of a polymerization catalyzer for a sufficient time to permit the greater part of the reaction to take place after which the temperature is raised to room temperature under increased pressure to complete the desired reaction.

3. A method for improving the characteristics of a lubricating oil which comprises adding to a lubricating oil a substantial proportion of a polymerization product of propylene, the said product being obtained by treating propylene containing material under super-atmospheric pressure and at a temperature in the neighborhood of −30 degrees C. in the presence of a polymerization catalyzer for a sufficient time to permit the greater part of the reaction to take place after which the temperature is raised to room temperature under increased pressure to complete the desired reaction.

HERBERT GOETHEL.
HEINRICH TRAMM.
PAUL SCHALLER.